B. T. TERVIN.
COMBINATION AUTOMOBILE STEERING POST LOCK.
APPLICATION FILED JAN. 13, 1920.
1,368,305.
Patented Feb. 15, 1921.
2 SHEETS—SHEET 2.
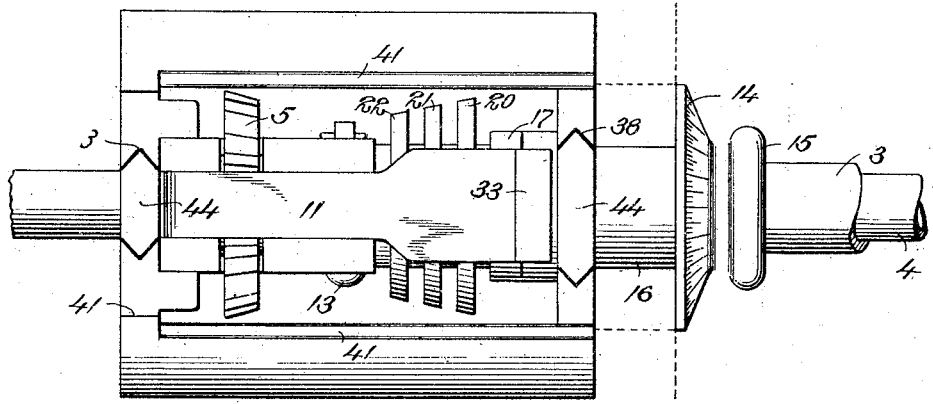
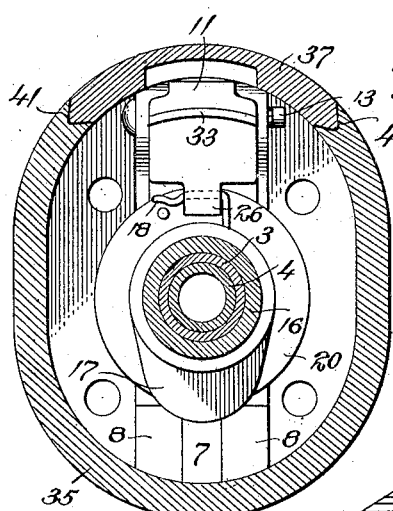
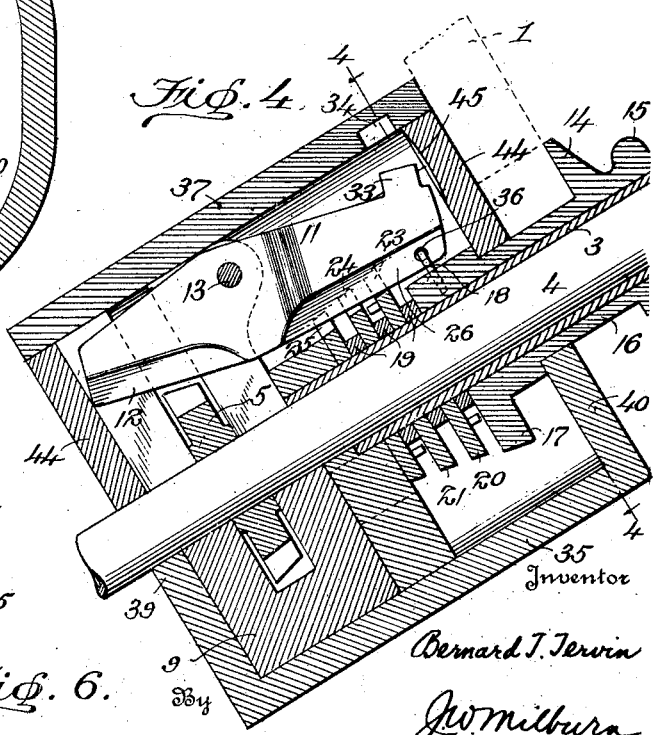
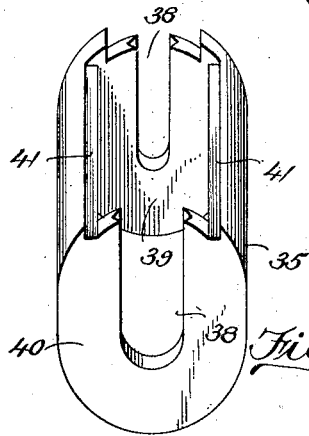
Inventor
Bernard T. Tervin
By J.W. Milburn
Attorney

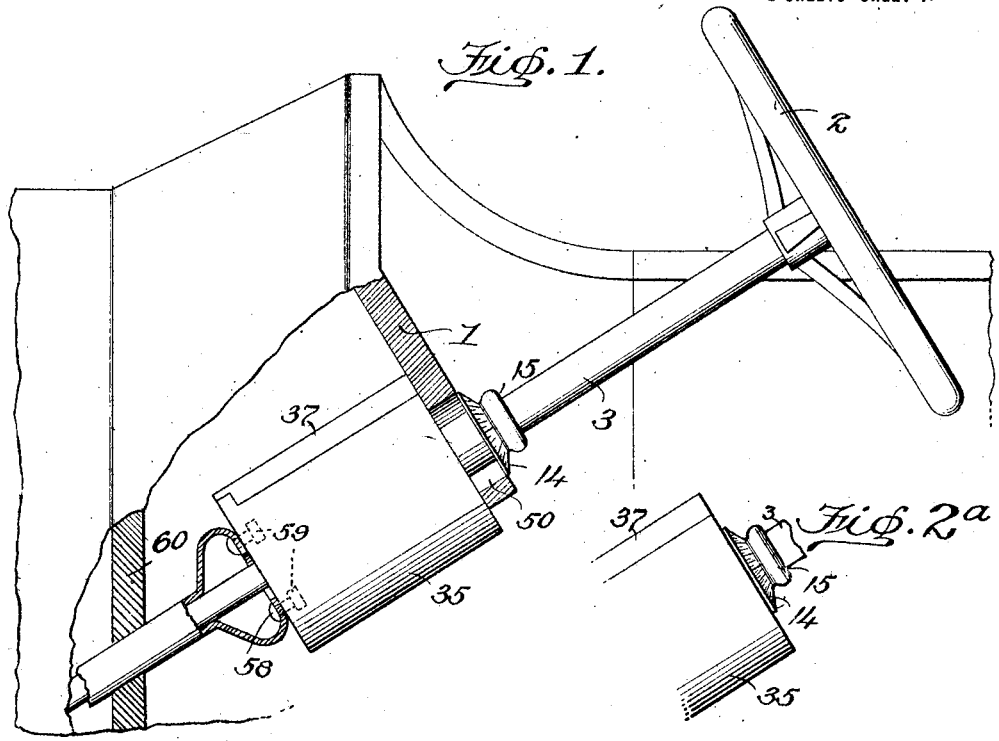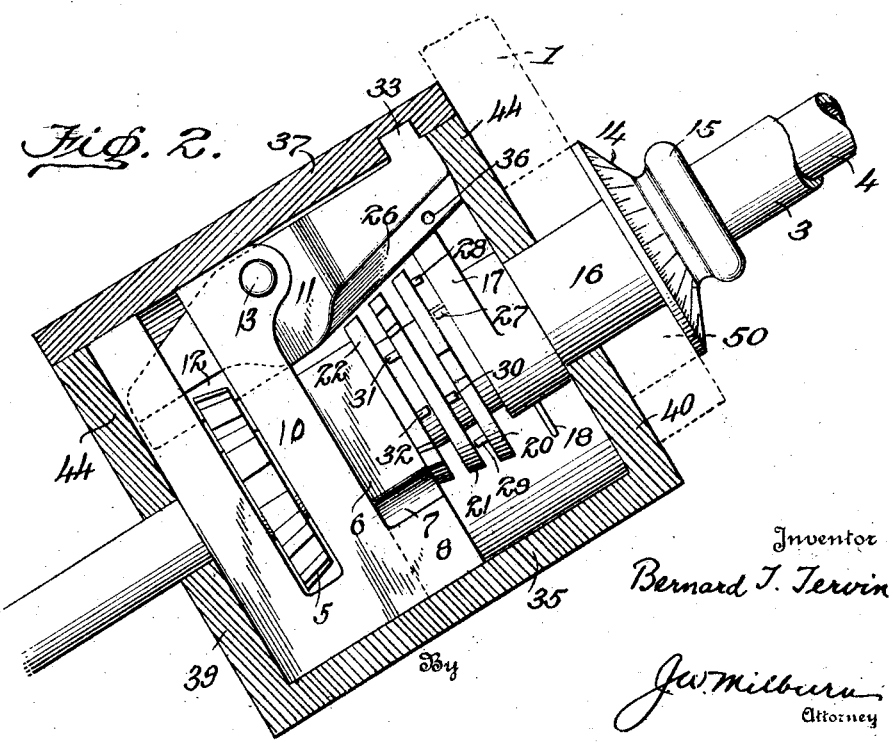

UNITED STATES PATENT OFFICE.

BERNARD TALMAGE TERVIN, OF CORDOVA, ALABAMA.

COMBINATION AUTOMOBILE-STEERING-POST LOCK.

1,368,305.  Specification of Letters Patent.  Patented Feb. 15, 1921.

Application filed January 13, 1920. Serial No. 351,107.

*To all whom it may concern:*

Be it known that I, BERNARD T. TERVIN, a citizen of the United States, residing at Cordova, in the county of Walker and State of Alabama, have invented certain new and useful Improvements in Combination Automobile-Steering-Post Locks, of which the following is a specification.

My invention relates to improvements in automobile locks in which a permutation locking means operates to lock or unlock the steering post of the automobile.

The object of the invention is to provide a simple and effective means controllable by a permutation lock whereby the steering wheel of a motor vehicle may be rendered inoperative so that the vehicle may not be driven by an unauthorized person.

A further object of my invention is to provide an inclosing casing of novel construction and arrangement for the locking mechanism, which casing is adapted to be applied to any automobile and which is designed to be locked simultaneously with and by the same means as the locking of the steering post, to prevent access to and tampering with the mechanism of the lock by unauthorized persons when the device is in locked position.

These and other objects of the invention will be fully illustrated in the drawings, described in the specification and pointed out in the claims.

In the accompanying drawings, wherein like reference numerals indicate like parts,—

Figure 1 is a side elevational view of the steering wheel lock attached to the steering post of an automobile, a part of the automobile being shown in connection therewith and the lock being greatly enlarged for purposes of illustration.

Fig. 2 is a side elevational view of the lock attached to the steering post, with the side of the lock casing removed for purposes of illustration, Fig. 2ª being a similar view of a modified form of the device, partly broken away, Fig. 3, a plan view of the lock attached to the steering post with the cover of the lock casing removed, Fig. 4, a central sectional view of the lock attached to the steering post, the view being taken on a plane parallel to that of the view in Fig. 2, Fig. 5, a view taken on line 4—4 of Fig. 4, looking in the direction of the arrows, and Fig. 6, a perspective view of the lock casing with the cover thereof removed, looking at the casing from the upper end thereof.

In the drawings, 60 indicates the dash of an automobile and 1 the instrument board having an opening 50 therethrough through which is adapted to be inserted the dial plate 14 of the permutation locking means forming a part of my steering post locking device. The numeral 2 indicates the steering wheel, 3 the casing for the steering post and 4 the steering post.

Fixed to the steering post 4 is a toothed disk 5, while fixed to the steering post casing 3 is a squared collar 6 having an integral lug 7 arranged to lie between spaced projections 8, 8 on the top of a bifurcated block 9. The block 9 straddles the steering post and has each of its arms 10 bifurcated to accommodate the toothed disk 5 and permit the latter to rotate in the slot formed between the upper and lower portions of the pair of arms 10. The end of block 9 opposite that which carries the projections 8, 8 is open and within the slot thus provided lies the lower end of a locking latch 11, pivotally mounted on pin 13 in the ends of arms 10 of the block 9.

The latch 11 is thinned at its lower end, as at 12, to enable it to seat easily between adjacent teeth of disk 5 and lock the disk and the steering post against rotation. The latch 11 is so shaped and constructed as to be heavier above than below its pivot and when used in connection with any angularly disposed or even vertically disposed steering post will normally assume the unlocked position illustrated in Fig. 4, with its lower end free of the teeth of the disk 5.

Near its upper end the latch 11 has an opening 36 for the reception of a hook 18 designed to positively retain the latch in its unlocked position. The latch is further provided, on its outer edge near its upper end, with a detent 33 adapted to engage and seat within a recess 34 in the inner surface of the slidably removable cover 37 of the casing 35.

The entire locking mechanism of my device is inclosed in the lock casing or housing 35, the casing being so constructed as to prevent access to its interior while the locking mechanism is in locked position. In each end wall (39, 40) of the casing is a slot 38 in which there is a removable wall-section 44, the removal of these sections permitting the removal of the lock casing from its position on the steering post or the application of the casing thereto, as the case may be. In the top wall of the lock casing is a cover 37 slidably removable from the casing from the front end thereof, the ends of the cover overlying the slots 38 in the end walls of the casing and preventing removal of the wall-sections 44 when the cover is seated on the casing. The lock casing may be mounted on the steering post either above or below the dash of the automobile in any suitable or convenient manner. Where, as illustrated in the drawings, the casing is below the instrument board, the cover 37 is of course not removable, its removal being prevented by the instrument board. But where the casing is applied to the steering post above the instrument board, or where it is applied to a steering post which does not come through the instrument board, the cover is capable of being removed and unless locked securely the locking mechanism within the casing might easily be tampered with and the steering post unlocked, thus rendering the device inoperative or ineffective. In the arrangement of the lock casing on the steering post which is illustrated in the drawings, the said casing is fastened to a portion of the steering post or its casing by means of bolts 58 which project through the lock casing and have their fastening means 59 secured from the interior of the casing.

The locking and unlocking of the device is controlled by means of a permutation lock operated by the rotation of a dial plate 14 of ordinary form, provided with the usual convenient form of turning knob 15. In the drawings the dial plate is shown positioned on the upper surface of the instrument board, the dial being put into place by being inserted through opening 50 from the under side of the instrument board, it being understood that the dial plate may be made to directly engage the top surface of the end wall 40 of the lock casing as in Fig. 2ª, this form of construction being designed for use on the steering post above the instrument board and on steering posts which do not come through the instrument board. Integrally connected to the dial plate 14 is a sleeve 16 rotatably mounted on the steering post casing 3. On the opposite end of the sleeve from the dial is an eccentric or cam fixed to the sleeve to rotate therewith, this eccentric or cam being positioned within the lock casing 35. The cam is provided on its lower side with a projecting hook 18 designed to be passed through opening 36 in latch 11 and hold said latch in its unlocked position. Immediately beneath the cam 17 and spaced from said cam and from one another by washers 19 are a plurality of tumbler disks 20, 21 and 22, each having a slot in its periphery of sufficient width to receive the upper thinned edge 26 of the latch 11. The slots in the tumbler disks 20, 21 and 22 are shown at 23, 24 and 25, respectively, in Fig. 4. On the lower surface of cam 17 is a pin 27 so located as to come into operative engagement with a similar pin on the upper surface of disk 20, permitting the movement of cam 17 to be imparted to disk 20 and cause the two disks to move together while the pins are maintained in engagement. Pins 29, 30, 31 and 32 are attached to the opposing surfaces of disks 20, 21 and 22, similarly permitting these disks to be moved together while the pins are in engagement and to be moved separately or in pairs under varying conditions and directions of movement of the dial 14 and its connected eccentric or cam 17.

The several parts of the device which are mounted on the steering post or steering post casing, including the lock casing 35, sleeve 16, tumbler disks and washers and blocks 6 and 9 are slidable on and off of the steering post and steering post casing when the device is not in locked position. This enables the device to be made of simple construction and to be assembled and disassembled quickly.

When the lock is in position on an automobile and it is desired to lock the steering wheel to prevent an unauthorized person from stealing or driving the car, the dial 14 is turned to lock the permutation lock. The turning of the dial rotates sleeve 16 and the eccentric or cam 17 on the lower end thereof, causing the cam 17 to ride up under the edge 26 of latch 11 after the hook 18 has been withdrawn from opening 36, tilting the latch on its pivot 13 and throwing the lower end 12 of the latch into position between adjacent teeth of the toothed disk 5, thus locking the steering post to which the toothed disk is fixed. The tilting of the latch to lock the steering post against rotation also serves to lock the cover 37 on the casing 35, through the engagement of the hook portion or detent 33 of the latch 11 in the recess 34 in the inner surface of the cover.

When the device is in locked condition and it is desired to unlock it, the dial 14 is turned to and fro in accordance with a predetermined combination until the turning of the dial 14, sleeve 16, eccentric or cam 17 and the several tumbler disks 20, 21 and 22 finally bring the several slots 23, 24 and 25 of the tumbler disks directly into register immediately below the edge 26 of latch 11. When this occurs the latch drops by gravity into the said slots, releasing detent 33 from its seat 34 and unlocking the casing cover 37. Simultaneously with this action the lower end of the latch 11 is raised free from the toothed wheel by the dropping of the upper end of said latch, this resulting in the unlocking of the steering post. In this position of the latch a slight turn of the dial 14 will cause the hook member 18 to pass through hole 36 in the latch to hold said latch in its unlocked position, thus insuring against possible accidental tilting of latch 11 into locking engagement with the toothed disk 5 through the jarring or vibration of the automobile while in motion.

It will of course be understood that the combination of the permutation locking device may be changed at will by altering the relative circumferential positions of the several pairs of tumbler pins 27, 28, 29, 30, 31 and 32 on their respective disks, proper provision being made for such adjustment through the making of a plurality of holes in each disk to removably but tightly hold the pins. It is preferable, however, to make the pin fast in the disk so that it cannot be removed, this avoiding any possibility of having the pins become loose and fall or be jarred out of position and being more simple from a manufacturing standpoint. It is proposed to sell these disks separately and the combination of the lock can be easily and inexpensively changed by the purchase and substitution of new disks with their pins in different circumferential relation.

It will be observed that the latch 11 when in position locking the steering post and the cover 37 of the housing or casing has its upper end immediately adjacent to the inner surface of the end wall of the housing. In this arrangement any attempt to slide or force the cover 37 while in locked condition will not put any considerable strain upon the latch or the other parts of the locking mechanism, the latch being braced at its upper end against the wall-section 44. The inner surface of the wall-section 44 is dished as at 45 to afford sufficient clearance to the upper adjacent end of the latch 11 in its swinging movement so that the end of the latch, when it is at its extreme upper or locking position is in contact with the face of the wall-section 44.

By spacing the teeth of the toothed disk 5 so that the latch 11 fits snugly between adjacent teeth, the movement of the latch into operative position locks the steering post rigidly against rotation. Where it is desired to lock the steering post in such a way as to permit of a small degree of rotation, which will allow the automobile to be turned sufficiently to remove it from a position in the line of traffic, but which will be insufficient to permit the car to be steered so as to be driven in the ordinary way, the teeth of the toothed disk 5 are spaced slightly farther apart to permit a small amount of play between the latch and the disk while the mechanism is in locked condition.

What I claim as new and desire to secure by Letters Patent is:—

1. A device for locking the steering post of an automobile comprising a latch pivotally mounted adjacent and substantially parallel to the steering post, a cam for moving said latch into position to lock the steering post, permutation locking means including means for rotating said cam, a plurality of rotatable tumbler disks each provided with a slot in its periphery and means for causing said tumbler disks to rotate separately or together, said latch being so constructed and positioned as to drop by gravity into said slots to unlock the steering post when said slots are brought into register, and means connected with said permutation locking means for holding said latch in unlocked or inoperative position.

2. In a steering post lock, the combination of a disk fixed to the steering post, a locking latch therefor, a permutation lock comprising a plurality of slotted disks on the steering post and rotatable thereon independently of each other or together, a cam for moving the latch into operative position and adapted to engage and rotate one or more of said slotted disks, means for rotating said cam, said latch being pivotally mounted adjacent to the steering post and being so positioned as to engage the first-mentioned disk to lock the steering post against rotation when said slotted disks are in a certain predetermined relation to each other and to drop by gravity away from said first-mentioned disk when said slotted disks are in a second predetermined relation.

3. In an automobile lock, the combination of a toothed disk fixed to the steering post of the automobile, a latch pivotally mounted above said disk and adjacent and substantially parallel to the steering post, said latch being movable into engagement with the toothed disk to lock the steering post against rotation, and a permutation lock including a cam adapted to engage the upper arm of said latch to move said latch into engagement with said disk, a plurality of rotatable tumbler disks each provided with a slot in its periphery and means for causing said tumbler disks to rotate separately or together, said latch being so constructed and positioned as to drop by gravity and unlock the steering post when the slots in the tumbler disks are brought into register.

4. In a steering post lock, the combination of a housing adapted to be mounted on the steering post, means within said housing for locking the steering post against rotation and for simultaneously locking said housing to render the inclosed locking means inaccessible, said means comprising a permutation lock operable from without the said housing.

5. In an automobile lock, a toothed disk fixed to the steering post of the automobile, a latch member pivotally mounted adjacent to said disk and normally held by gravity out of locking position, permutation locking means for forcing said latch into locking engagement with said toothed disk or permitting said latch to fall away from said disk by gravity, and means connected with the permutation locking means for holding said latch out of engagement with said toothed disk while the locking means is in unlocked position.

6. In an automobile lock, the combination of a toothed disk fixed to the steering post of the automobile, a latch member pivotally mounted in substantially vertical position with its lower arm adjacent to said disk and movable into engagement therewith to lock the steering post against rotation, and a permutation locking means for moving said latch into engagement with said disk, said locking means comprising a plurality of rotatable tumbler disks each provided with a slot in its periphery, and means for causing said tumbler disks to rotate separately or together, the latch member having its upper arm weighted and being so arranged as to drop by gravity into said slots and unlock the steering post when said slots are brought into register.

7. In a steering post lock, the combination of a casing or housing adapted to be mounted on the steering post, said casing or housing having an opening in one side thereof, means for closing said opening, means within said casing or housing for locking the steering post against rotation and for simultaneously locking said closing means in closed position to render the inclosed locking means inaccessible, and a single manually operable means without the casing or housing for actuating the said locking means to accomplish both of said locking operations.

8. In a steering-post lock, the combination of a casing or housing adapted to be mounted on the steering post, said casing or housing having an opening in one side thereof, a removable closure for said opening provided with means on its inner surface for receiving a latch, means within said casing or housing for locking the steering post against rotation and for locking said closure on the casing to render the inclosed locking means inaccessible, said locking means comprising a toothed disk fixed to the steering post, a pivoted latch one arm of which is adjacent to said disk and the other arm of which is positioned between the steering post and the latch-receiving means on the inside of the casing closure, permutation locking means for tilting said latch to move one of its arms into engagement with said disk to lock the steering post and to move the other arm into position to lock the closure on the casing, said latch being so positioned and arranged as to drop by gravity to release both of its arms from their locking engagements simultaneously.

BERNARD TALMAGE TERVIN.